US011635828B2

(12) United States Patent
Abzarian et al.

(10) Patent No.: US 11,635,828 B2
(45) Date of Patent: Apr. 25, 2023

(54) ADAPTABLE DIGITAL PEN AND TOUCH SENSITIVE DEVICE

(71) Applicant: Microsoft Technology Licensing, LLC, Redmond, WA (US)

(72) Inventors: David Abzarian, Kenmore, WA (US);
Jerry K. Koh, Bothell, WA (US);
Connor Weins, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 31 days.

(21) Appl. No.: 17/487,977

(22) Filed: Sep. 28, 2021

(65) Prior Publication Data

US 2022/0019299 A1 Jan. 20, 2022

Related U.S. Application Data

(63) Continuation of application No. 16/119,406, filed on Aug. 31, 2018, now Pat. No. 11,137,839.

(51) Int. Cl.
*G06F 3/0354* (2013.01)
*G06F 1/16* (2006.01)
(Continued)

(52) U.S. Cl.
CPC ........ *G06F 3/03545* (2013.01); *G06F 1/1698* (2013.01); *G06F 3/044* (2013.01); *G06F 3/0414* (2013.01)

(58) Field of Classification Search
CPC .. G06F 1/1698; G06F 3/03545; G06F 3/0414; G06F 3/044
See application file for complete search history.

(56) References Cited

U.S. PATENT DOCUMENTS 10,061,407 B2 * 8/2018 Hara ................. G06F 3/04166
2015/0277587 A1 * 10/2015 Chandran ........... G06F 3/03545
345/173

(Continued)

FOREIGN PATENT DOCUMENTS

WO 2014158502 A1 10/2014

OTHER PUBLICATIONS

"Office Action Issued in Indian Patent Application No. 202047057040", dated Nov. 17, 2022, 5 Pages.

*Primary Examiner* — Michael Pervan
(74) *Attorney, Agent, or Firm* — Weaver IP L.L.C.

(57) ABSTRACT

Methods and apparatuses are provided that address interoperability limitations of current digital pens and touch sensitive devices. In aspects, methods are provided for operating an adaptable digital pen and touch sensitive device to determine the best means for pen state information such as pressure information to be transferred from the pen to the device. A digital pen includes multiple communication interfaces to permit wide compatibility with touch sensitive devices. A communication interface is provided that enables the digital pen to communicate via an active pen protocol with a digitizer of the touch sensitive device while operating in a first mode. Another communication interface is provided as an alternative channel for communicating pen state information to the touch sensitive device while operating in a second mode. Where neither such interface suffices for communicating pen state information to the touch sensitive device, the digital pen may operate in a reflective capacitive mode.

20 Claims, 8 Drawing Sheets

(51) Int. Cl.
  *G06F 3/041* (2006.01)
  *G06F 3/044* (2006.01)

(56) References Cited

U.S. PATENT DOCUMENTS

2015/0331502 A1* 11/2015 Perrin .................... G06F 3/0383
                                                            345/179
2016/0162051 A1*  6/2016 Peretz .................... G06F 3/0442
                                                            345/179
2016/0306448 A1* 10/2016 Fleck ..................... G06F 3/0414
2017/0249029 A1*  8/2017 Watanabe ............ G06F 3/04162
2018/0120962 A1*  5/2018 Hara ..................... G06F 3/0442

* cited by examiner

500

| 502 | Attempt to establish two-way communication with the touch sensitive device through the first communication channel while operating the digital pen in the first mode, and when the attempt is successful, continue to operate the digital pen in the first mode. |

| 504 | When the attempt to establish two-way communication with the touch sensitive device through the first communication channel is not successful, attempt to establish two-way communication with the touch sensitive device through the second communication channel. |

| 506 | When the attempt to establish two-way communication with the touch sensitive device through the second communication channel is successful, determine through the second communication channel whether the touch sensitive device is enabled to receive one-way communication of the pen state information from the digital pen via the first communication channel. |

| 508 | When it is determined that the touch sensitive device is enabled to receive one-way communication of pen state information via the first communication channel, continue to operate the digital pen in the first mode. |

| 602 — When it is determined that the touch sensitive device is not enabled to receive pen state information via the second communication channel or when the attempt to establish two-way communication with the touch sensitive device through the second communication channel is not successful, operate the digital pen by operating the pen tip with reflective capacitive output characteristics and not transmitting pen state information. |

| 702 — Determine whether the touch sensitive device is receiving pen state information from the digital pen via a first communication channel while operating the touch sensitive device in a first mode. |

↓

| 704 — In response to determining that the touch sensitive device is receiving pen state information from the digital pen via the first communication channel, continue to operate the touch sensitive device in the first mode. |

↓

| 706 — In response to determining that the touch sensitive device is not receiving the pen state information via the first communication channel, switch the touch sensitive device to operate in a second mode and determine whether the touch sensitive device is enabled to receive the pen state information from the digital pen via a second communication channel. |

↓

| 708 — In response to determining that the touch sensitive device is enabled to receive the pen state information via the second communication channel, continue to operate the touch sensitive device in the second mode. |

FIG. 7

ADAPTABLE DIGITAL PEN AND TOUCH SENSITIVE DEVICE

CROSS-REFERENCE TO RELATED APPLICATIONS

This application is a continuation of U.S. patent application Ser. No. 16/119,406, filed Aug. 31, 2018, the entirety of which is incorporated by reference herein.

BACKGROUND

Writing and drawing with pencils, crayons or markers and the like, continues to be one of the earliest skills people achieve, and use of pencils and pens in everyday life is ubiquitous. The advent of touch sensitive screens, graphic tablets, digital art boards, and similar input devices for computers and mobile devices created and sustains demand for specialized tools that mimic ordinary pencils and pens when used with such devices. That is, there is a demand for pen-like devices specially designed for use with touch sensitive input devices, and that greatly enhance the precision and "feel" of the device when used to write or draw on such input devices. These pen-like devices are typically referred to as digital or active pens.

A typical digital pen must be used in combination with a compatible touch sensitive input device, such as a tablet, that includes digitizer and other circuitry and programming necessary for the input device to quickly and accurately determine information about the state of the pen. Such information may include the location of the digital pen on the tablet face, the amount pressure being applied by the user, and the tilt angle of the digital pen and other information. Unfortunately, the circuitry and programming required for a digital pen and tablet to function together is usually proprietary to a particular company or manufacturer. Simply put: not all digital pens are compatible with all tablets.

The lack of compatibility has at least a few consequences. For one, consumers often accidentally buy a digital pen that is incompatible with their tablet despite extensive efforts to label the digital pen packaging properly. This problem is exacerbated by the breakneck pace of technological advancement whereby new products including touch sensitive screens are coming to market near constantly. The market is likewise being hit with many digital pens for these new devices, many of which are not compatible with devices only one or two years old. Thus, the marketplace for pens is confusing, and the lack of universal or adaptable devices results in obsolescence. Moreover, many people use multiple touch sensitive devices at work and at home on any given day, but adaptable digital pens are not available to use with some or all of such devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and apparatuses are provided that address limitations of current digital pens and touch sensitive devices inasmuch as many such pens and devices are incapable of interoperating. In aspects, methods are provided for operating an adaptable digital pen to determine the best means for the adaptable digital pen to communicate with a touch sensitive device to permit pen state information to be transferred thereto. In other aspects, methods are provided for operating a touch sensitive device to similarly determine the best means to communicate with a digital pen to permit receipt of pen state information therefrom. In embodiments, methods are provided to operate the digital pen or touch sensitive device in a reflective capacitive mode or as a capacitive touch sensitive device, respectively, and without sending or receiving pen state information, where other methods are unable to determine how to send or receive, respectively, pen state information. In other aspects an adaptable digital pen is provided, and embodiments are configured to determine the best means for the adaptable digital pen to communicate with a touch sensitive device to permit pen state information to be transferred thereto.

In one implementation, a digital pen is enabled to determine whether a touch sensitive device is enabled to receive pen state information via a first communication channel while operating in a first mode, and if so, operating the digital pen in a first mode. Where the digital pen is unable to make such a determination or where it is determined that the touch sensitive device is not enabled to receive pen state information via the first communication channel, embodiments of the digital pen are enabled to switch the digital pen to a second operating mode and determine whether the touch sensitive device is enabled to receive pen state information via a second communication channel. If the touch sensitive device is so enabled, the digital pen continues to operate in the second operating mode. Otherwise, in embodiments, the digital pen is enabled to operate in as a reflective capacitive digital pen, and not send pen state information to the touch sensitive device.

In another implementation, a touch sensitive device is enabled to determine whether the touch sensitive device is receiving pen state information from a digital pen via a first communication channel while operating in a first mode, and if so, operating the touch sensitive device in a first mode. Where the touch sensitive device is unable to make such determination, or where it is determined that the touch sensitive device is not enabled to receive pen state information via a first communication channel, embodiments of the touch sensitive device are enabled to switch the touch sensitive device to the second operating mode, and determine whether the touch sensitive device is enabled to receive pen state information from a digital pen via a second communication channel. If the touch sensitive device is so enabled, the touch sensitive device continues to operate in the second operating mode. Otherwise, in embodiments, the touch sensitive device is enabled to operate as a capacitive touch sensitive device, and not receive pen state information from a digital pen.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 5 shows a flowchart of a process for determining whether a touch sensitive device is receiving pen state information from a digital pen via a first communication channel while operating in a first mode, according to an embodiment.

FIG. 6 shows a flowchart of a process for determining that an adaptable digital pen cannot be configured to operate with a touch sensitive device in either a first mode or a second mode, according to an example embodiment.

FIG. 7 shows a flowchart of a process for determining whether to operate a touch sensitive device with a digital pen in a first mode or second mode, according to an embodiment.

Figure 1:
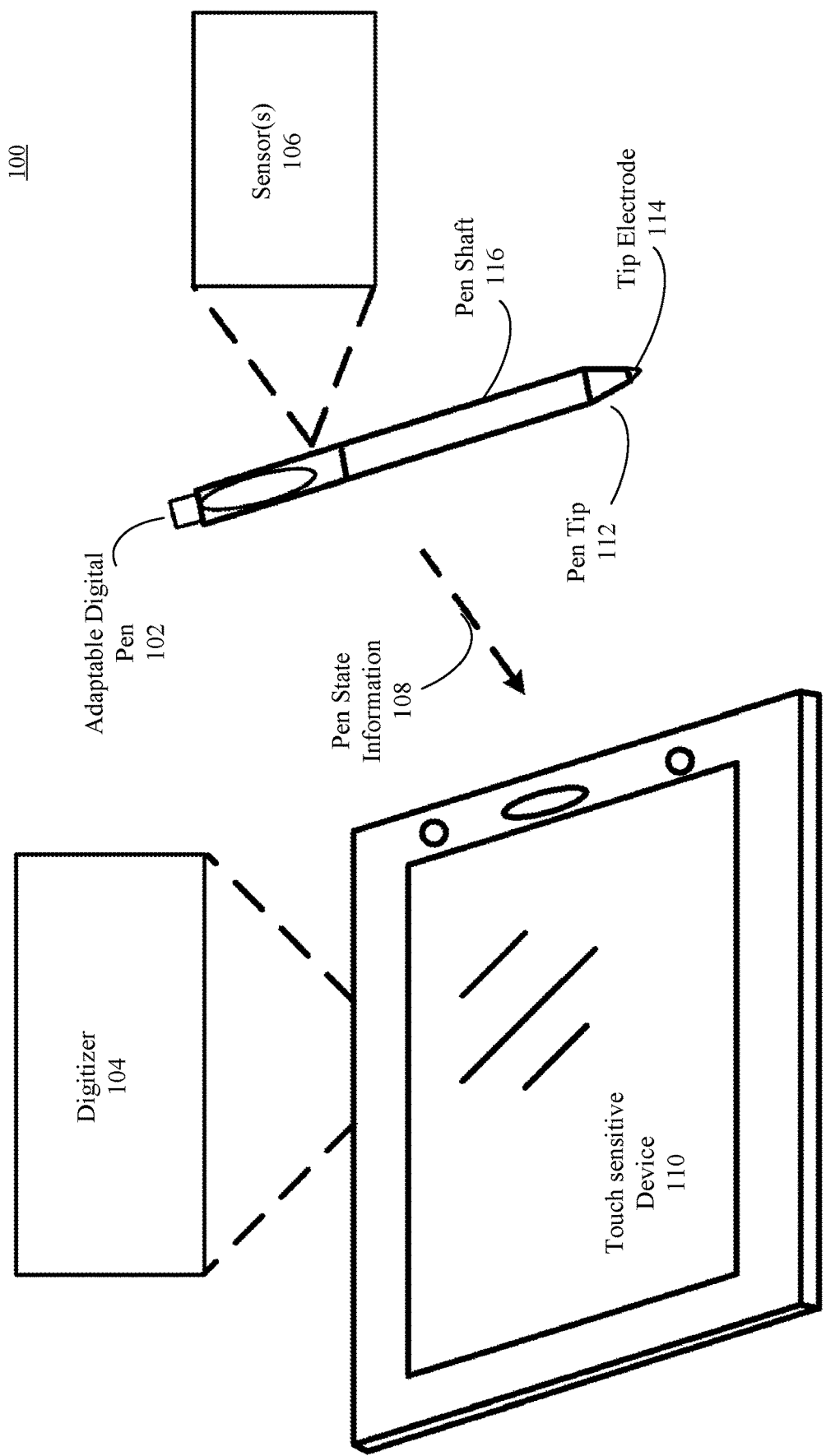
FIG. 1 shows a block diagram of an adaptable digital pen and touch sensitive device system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments.

Embodiments are configured to allow flexible and adaptable operation of digital pens and touch sensitive devices. Touch sensitive devices generally include a digitizer for detecting touch input from a finger or digital pen. Digitizers typically operate in one of two modes. For example, digitizers in mobile touch sensitive devices such as smart phones and tablets generally operate in a capacitive multi-touch mode using capacitive sensors. One such type of sensor is called a 'mutual capacitive' sensor that is typically formed as a matrix including transparent conductive material (e.g. Indium Tin Oxide [ITO]) arranged in parallel rows and columns, with a capacitor node created where the rows and columns overlap, deposited in layers over the top of the active pixel layers (e.g. LED, OLED or LCD layers) of a touch sensitive display. Touching the surface of the touch sensitive display with a finger or other conductive object induces a change in the charge storage capacity, and hence capacitance, of the capacitor nodes (i.e., overlapping layers) in the vicinity of the touch. Each capacitive node is associated with one or more pixels of the display screen that are immediately below the contact point on the screen. The change in capacitance of the capacitor nodes may be detected to determine touch location of the finger or conductive object on the touch sensitive display. The capacitance change may be detected by rapidly sampling each node by any of a variety of techniques as is known in the art. Mutual capacitive detection allows multi-touch operation where multiple touch objects (e.g., fingers) can be tracked at the same time.

Digitizers that include mutual capacitive sensors may, within certain limits, function to accept touch input with anything capable of inducing a capacitance change in the sensors with perhaps the most familiar example being, a user's finger. Another example includes what is often referred to as a passive stylus. A passive stylus typically includes a relatively large, flexible and blunt tip that is internally electrically connected to the shaft of the stylus that is itself conductive. When held in the hand, the stylus becomes essentially an electrical extension of the hand, acting as an artificial finger that may be used as one would a pen. One problem with this type of stylus is that there are limits to how small you can construct the tip and expect it to function properly with touch sensitive devices. If the tip is too small, it may not be capable of changing sensor node capacitance enough to properly be read out (i.e., input may appear as noise and be filtered out as such). A large, flexible tip may offer all the precision needed for simply navigating menus on the device or webpages. Such a tip is generally not, however, precise enough to use for art drawings or much else. It is also difficult or impossible to see the contact point of the stylus on the touch sensitive leading to further inaccuracy. To address these and other shortcomings of a passive stylus, other types of digital pen have been created.

One type of digital pen operates in a mode generally known as "reflective capacitive." As discussed above, the act of touching a capacitive sensor based digitizer induces a change in the charge stored in capacitor nodes of the digitizer at the touch point. It is also the case, however, that this action also induces a change in the charge stored at the tip electrode of, for example, a digital pen. A reflective capacitive digital pen operates to detect and measure the induced current or voltage change at the tip electrode, and then amplify that change in response. The result is additional capacitance change at the capacitor nodes due to the amplification, and therefore a much stronger touch signal being detected by the digitizer. Because of the amplification, it is possible to produce a digital pen with a much smaller and rigid tip that may provide the digitizer with higher spatial resolution.

Another type of digital pen operates in a manner similar to a reflective capacitive digital pen but may include the ability to communicate information directly to the touch sensitive device itself and may also include specifically engineered tip electrode characteristics designed to work with a matching digitizer design. This type of digital pen is generally known as a "active digital pen." Such active digital pens and their matching digitizers may feature excellent spatial resolution desirable by, for example, graphic designers and artists. Moreover, the ability to establish one-way communication from digital pen to the digitizer, or two-communication between them, permits additional information to be collected by the digitizer, and provided to host applications running on, for example, the counterpart touch sensitive device.

Embodiments of an adaptable digital pen disclosed herein below are enabled to automatically switch the digital pen between one of three modes of operation depending on the operating requirements of a particular touch sensitive device: a reflective capacitive operating mode, or one of two types of active pen operating modes.

For example, FIG. 1 shows a block diagram of an adaptable digital pen and touch sensitive device system 100, according to an example embodiment. System 100 includes a touch sensitive device 110 and an adaptable digital pen 102 enabled to send pen state information 108 to touch sensitive device 110. Adaptable digital pen 102 includes sensor(s) 106, a pen shaft 116, a pen tip 112 and a tip electrode 114. Touch sensitive device 110 includes a digitizer 104. These features of system 100 are described as follows.

Adaptable digital pen 102 is a digital pen adapted to function with myriad touch sensitive devices such as, for example, touch sensitive device 110. As discussed in greater detail below, embodiments of adaptable digital pen 102 may be enabled to gather pen state information 108 such as, for example, pressure data from a pressure sensor included in sensor(s) 106 and determine a means by which adaptable digital pen 102 can be enabled to communicate pen state information 108 to touch sensitive device 110. In embodiments, pen state information 108 may include many types of information related to an operating state of adaptable digital pen 102. For example, pen state information 108 may include pressure sensor information, pen identifier information, timestamp information, tilt angle information, information based on a state of at least one inertial sensor, or information based on a state at least one button of digital pen 102.

Pressure sensor information may comprise information that reflects an amount of pressure or force being exerted on pen tip 112 of adaptable digital pen 102. As discussed above, such information may be useful for applications to vary a rendering of digital ink in, for example, a graphic design application.

Pen identifier information may include any type of information that may be used by touch sensitive device 110, or an application running thereon, to configure the operation touch sensitive device 110, or the application. For example, in an embodiment, touch sensitive device 110 may include a configurable digitizer 104 capable of exhibiting different operating properties, depending on an exact make and model of adaptable digital pen 102, as reflected in the pen identifier information included in pen state information 108.

As will be discussed in more detail below, timestamp information may be useful for touch sensitive device 110 to correlate received pen state information 108 with corresponding touch input as detected by digitizer 104 of touch sensitive device 110.

In an embodiment, adaptable digital pen 102 may be configured to provide tilt angle information as part of pen state information 108. Tilt angle information may comprise any information that reflects or can be used to compute an angle adaptable digital pen 102 is making with a surface of touch sensitive device 110. For example, tilt angle information may include information related to tilt angle as measured by one or more solid-state sensors of sensor(s) 106 such as a solid-state inclinometer or solid-state accelerometer. Where touch sensitive device 110 also includes hardware capable of measuring a tilt angle of touch sensitive device 110 relative to the ground, tilt angle information received from adaptable digital pen 102 as part of pen state information 108 may be used to compute the angle adaptable digital pen 102 is making with the surface of touch sensitive device 110.

Although not shown in FIG. 1, embodiments of adaptable digital pen 102 may also include one or more buttons disposed on pen shaft 116 or at its end opposite pen tip 112. Such buttons may be configured to perform predetermined functions when pressed, such as enabling an eraser mode, or functioning as a right-click in a user interface of touch sensitive device 110, and information related to the state of such buttons may be relayed to touch sensitive device 110 as part of pen state information 108.

In one embodiment, adaptable digital pen 102 may be configured to communicate with touch sensitive device 110 via a first communication interface. In an embodiment, the first communication interface may comprise a radio frequency (RF) communication interface using an active pen protocol. In an embodiment, tip electrode 114 may act as an antenna for transmitting RF signals wirelessly to touch sensitive device 110, where such signals may be received and decoded by digitizer 104 according to the active pen protocol. In other embodiments, however, adaptable digital pen 102 may include a separate antenna configured to couple adaptable digital pen 102 to touch sensitive device 110 wirelessly via an RF connection. In either case, embodiments of adaptable digital pen 102 also include a second communication interface separate from the first communication interface for attempting to establish a communication channel between adaptable digital pen 102 and touch sensitive device 110. In an embodiment, the second communication interface may comprise a Bluetooth interface. The purpose of the second communication interface is to permit adaptable digital pen 102 to be more widely compatible with a number of different makes and models of touch sensitive devices 110.

For example, touch sensitive device 110 may not be capable of receiving pen state information 108 via a direct RF connection between adaptable digital pen 102 and digitizer 104 of touch sensitive device 110. As discussed in more detail below, embodiments of touch sensitive device 110 may therefore be configured to communicate pen state information 108 via an alternative communication interface, such as, for example, a Bluetooth interface. In the event adaptable digital pen 102 is incapable of communicating pen state information one way to touch sensitive device 110 via either, for example, the active pen protocol RF communication interface, or the Bluetooth interface, adaptable digital pen 102 may be configured to operate as a reflective capacitive digital pen, and not transmit pen state information 108. Note that foregoing general description of the operation of system 100 is provided for illustration only, and embodiments of system 100 may comprise different hardware and/or software and may operate in manners different than described above.

System 100 of FIG. 1 is now further described with respect to example embodiments. In particular, each of adaptable digital pen 102 and touch sensitive device 110 shall be described in further detail herein below while describing FIGS. 2 and 3, respectively.

Figure 3:
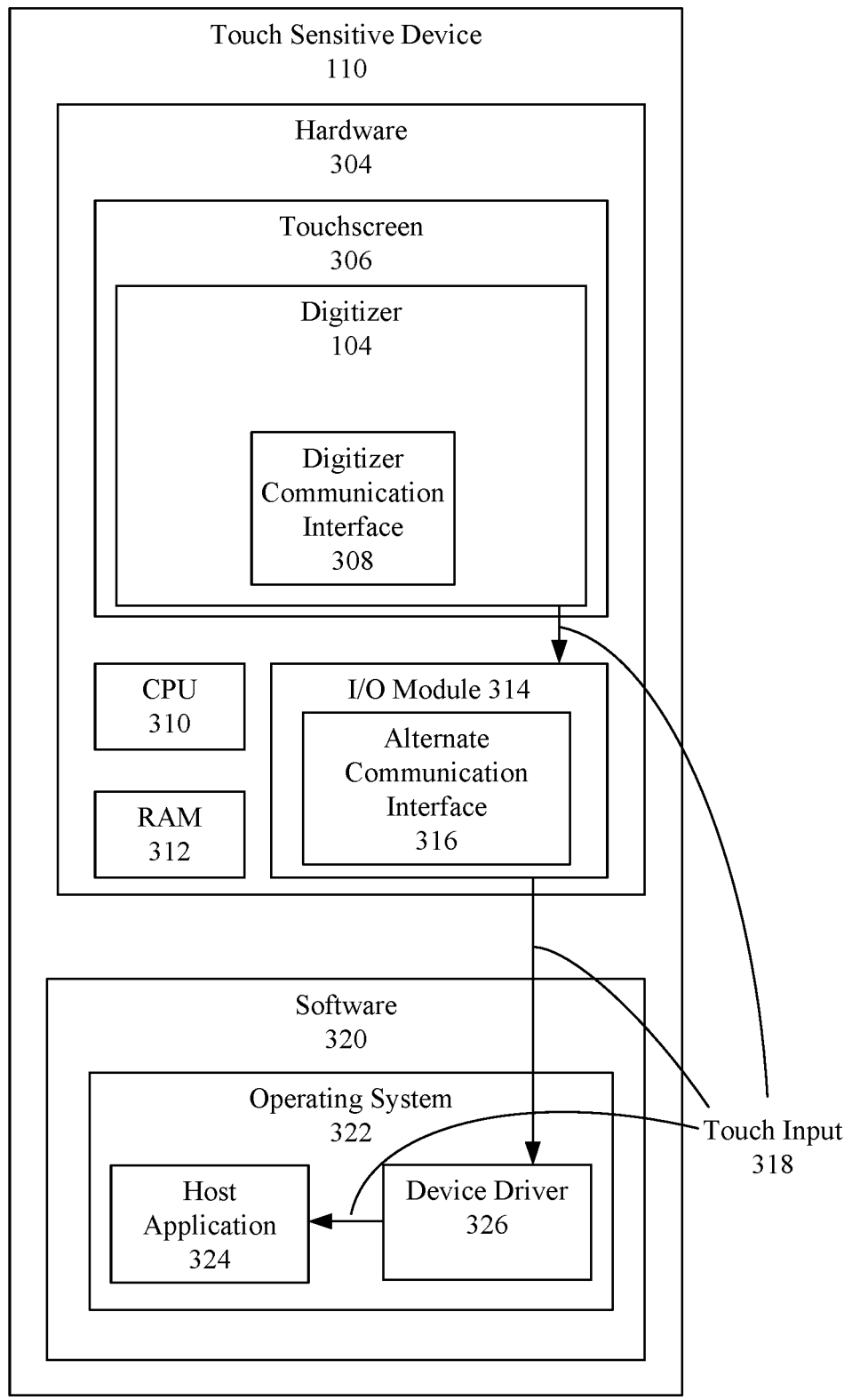
FIG. 3 shows a touch sensitive device, according to an example embodiment.

In an embodiment, adaptable digital pen 102 is a digital pen that is enabled to operate in various modes to adapt its operation to the requirements of various compatible touch sensitive devices. Note, as will be discussed in more detail below, such compatible touch sensitive devices need not include embodiments of touch sensitive device 110 as shown in FIG. 3. Instead, embodiments of adaptable digital pen 102 are enabled to attempt to determine an operating mode for adaptable digital pen 102 that may be compatible with any touch sensitive device, and to operate adaptable digital pen 102 in the determined mode. Embodiments of adaptable digital pen 102 may comprise various hardware configurations.

Figure 2:
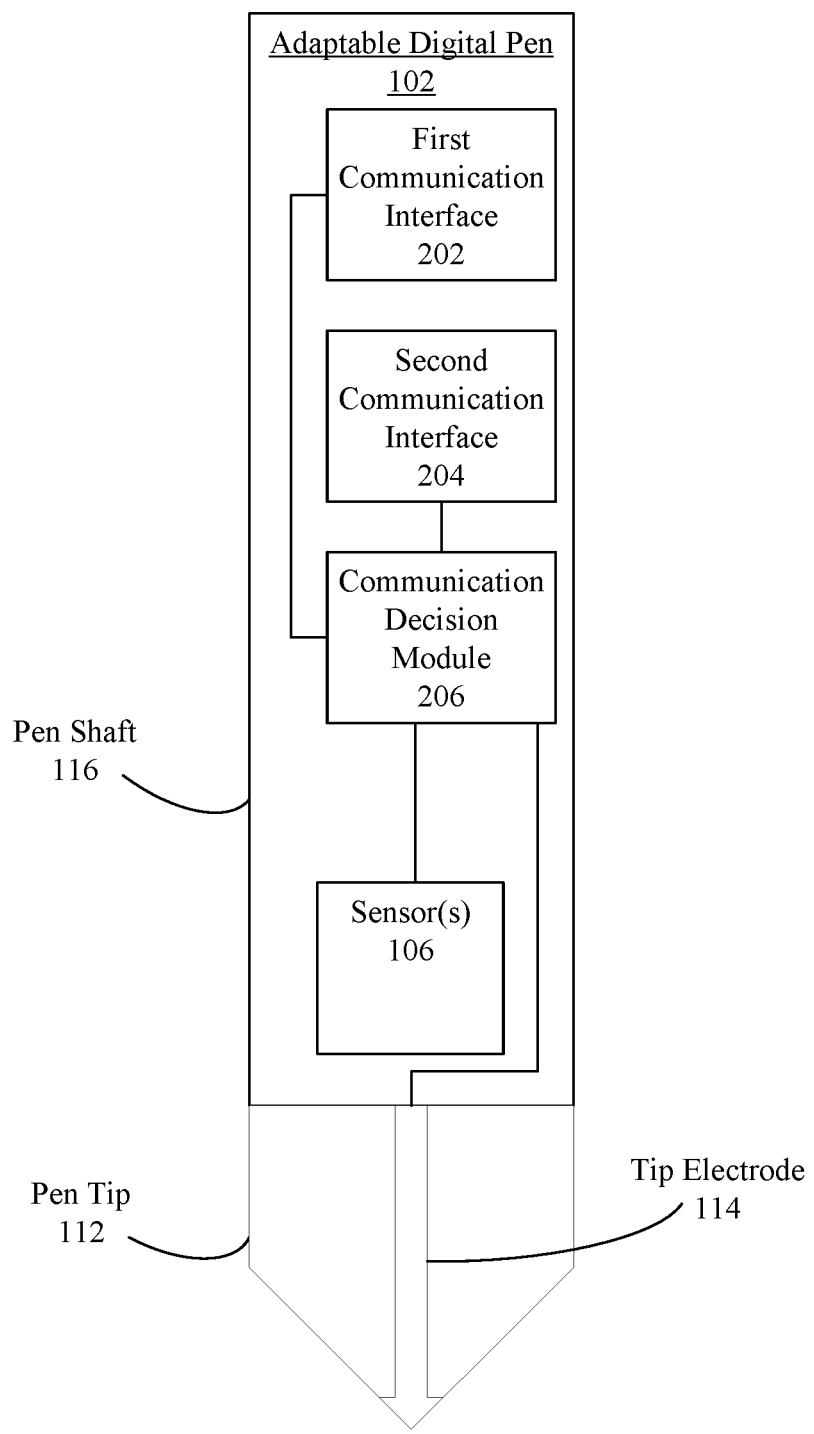
FIG. 2 shows an adaptable digital pen, according to an example embodiment.

For example, FIG. 2 shows an adaptable digital pen 102 according to an example embodiment. Adaptable digital pen 102 of FIG. 2 includes pen shaft 116 where first communication interface 202, second communication interface 204, communication decision module 206 and sensor(s) 106 may be located. One end of pen shaft 116 includes pen tip 112 that itself includes tip electrode 114. In an embodiment, first communication interface 202, second communication interface 204, and sensor(s) 106 are coupled to communication decision module 206. Communication decision module 206 is in turn coupled to tip electrode 114. A description of an embodiment of adaptable digital pen 102 in operation will now be discussed in conjunction with the discussion of flowchart 400 of FIG. 4.

Figure 4:
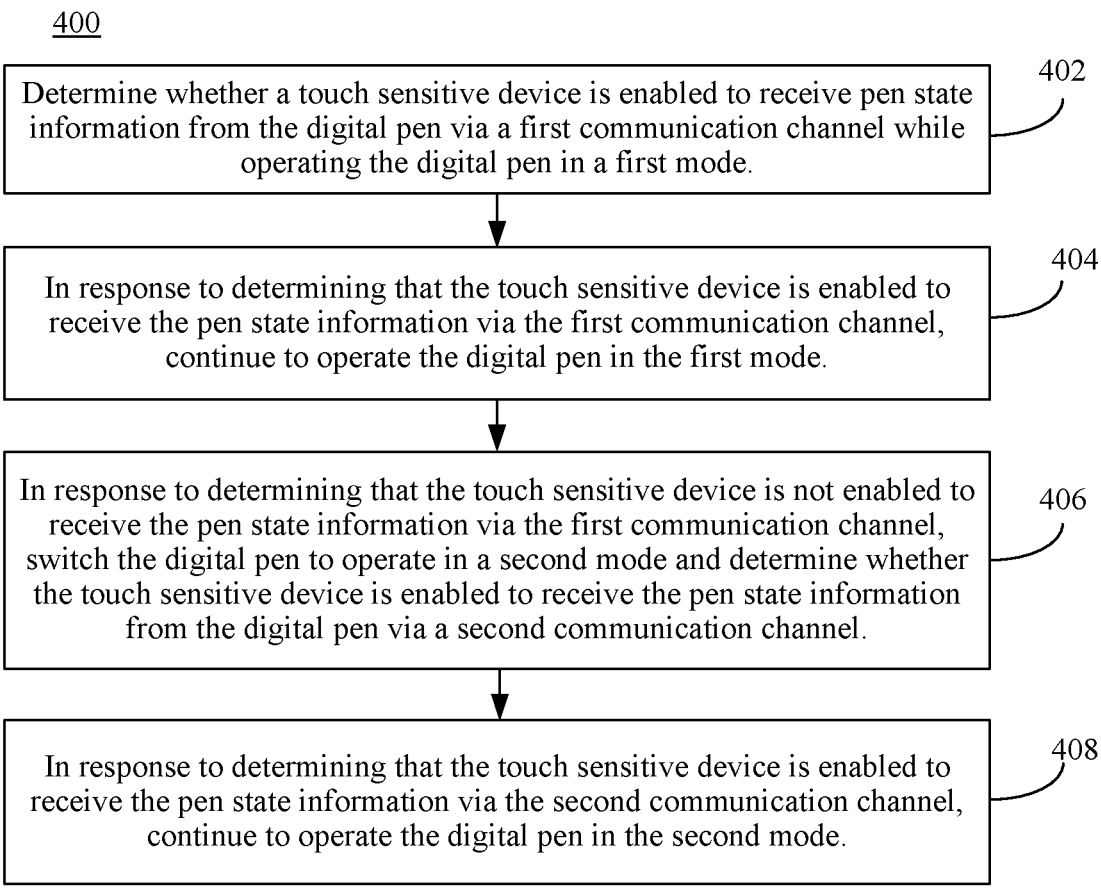
FIG. 4 shows a flowchart of a process for determining whether to operate an adaptable digital pen with a touch sensitive device in a first mode or a second mode, according to an embodiment.

FIG. 4 shows a flowchart 400 of a process for determining whether to operate adaptable digital pen 102 of FIG. 2 with a touch sensitive device in a first mode or a second mode, according to an embodiment. In this context, and as explained in further detail below, operating adaptable digital pen 102 in a first mode comprises: operating tip electrode 114 with active pen protocol output characteristics, intermittently collecting pen state information 108, and transmitting same to touch sensitive device 110 via first communication interface 202 of FIG. 2. Likewise, operating adaptable digital pen 102 in a second mode comprises: operating tip electrode 114 with reflective capacitive output characteristics, intermittently collecting pen state information 108, and transmitting same to touch sensitive device 110 via second communication interface 204 of FIG. 2.

In an embodiment, the process of flowchart 400 may be performed by communication decision module 206 of adaptable digital pen 102. Note, however, that in other embodiments, one or more steps of flowchart 400 may be performed by other modules or components of adaptable digital pen 102. For instance, any operations described hereinafter as being performed by communication decision module 206 may be integrated into one or more other modules. For example, in an embodiment, first communication interface 202, second communication interface 204, and communication decision module 206 may be incorporated into a single module. Flowchart 400 is described with continued reference to FIG. 2. However, other structural and operational embodiments will be apparent to persons skilled in the relevant art(s) based on the following discussion regarding flowchart 400 and adaptable digital pen 102 of FIG. 2.

Flowchart 400 begins with step 402. Step 402 determines whether a touch sensitive device is enabled to receive pen state information from a digital pen via a first communication channel while operating the digital pen in a first mode. For example, as shown in FIG. 1, communication decision module 206 of adaptable digital pen 102 may be configured to determine whether touch sensitive device 110 is enabled to receive pen state information 108 from adaptable digital pen 102 via the communication channel associated with first communication interface 202 of FIG. 2. In an embodiment, adaptable digital pen 102 may be configured to operate in a first mode, whereby pen state information 108 is transmitted using first communication interface 202 as shown in FIG. 2. As discussed above, first communication interface 202 may comprise an RF communication interface adapted to operate in the first mode by using an active pen protocol to communicate directly with digitizer 104 of touch sensitive device 110, as is known in the art. In other embodiments, however, first communication interface 202 may comprise any type of wireless communication interface that may or may not be adapted to use an active pen protocol and that may or may not communicate directly with digitizer 104.

In embodiments, communication decision module 206 may determine whether touch sensitive device 110 is enabled to receive pen state information 108 via first communication interface 202 by continually transmitting according to an active pen protocol while listening for return communication from touch sensitive device 110 that is compliant with the active pen protocol being employed. In another embodiment, adaptable digital pen 102 may be capable of communicating via first communication interface 202 using any of a number of different active pen protocols and may attempt to establish communication with touch sensitive device 110 by trying each different active pen protocol in turn until one such active pen protocol works, or until such time as every active pen protocol has been attempted, and no response was received. In embodiments, communication decision module 206 is configured to determine that touch sensitive device 110 is enabled to receive pen state information 108 upon successful receipt of return communication from touch sensitive device 110 via first communication interface 202.

Flowchart 400 continues with step 404. At step 404, in response to determining that the touch sensitive device is enabled to receive the pen state information via the first communication channel, embodiments will continue to operate adaptable digital pen 102 in the first mode. For example, when communication decision module 206 of adaptable digital pen 102 determines that touch sensitive device 110 is enabled to receive pen state information 108 while operating in the first mode, communication decision module 206 will continue to operate adaptable digital pen 102 in the first mode since operating in the first mode will suffice for delivering pen state information 108 to touch sensitive device 110.

Flowchart 400 continues with step 406. At step 406, in response to determining that the touch sensitive device is not enabled to receive the pen state information via the first communication channel, the digital pen is switched to operate in a second mode, and it is determined whether the touch sensitive device is enabled to receive the pen state information from the digital pen via a second communication channel. For example, and with reference to FIG. 1, communication decision module 206 may be configured to operate adaptable digital pen 102 in a second mode, and to determine whether touch sensitive device 110 is enabled to receive pen state information 108 from adaptable digital pen 102 via the communication channel associated with second communication interface 204 of FIG. 2. In an embodiment, communication decision module 206 may be configured to operate adaptable digital pen 102 in a second mode, whereby pen state information 108 is transmitted using second communication interface 204 as shown in FIG. 2. As discussed above, second communication interface 204 may comprise a Bluetooth communication interface adapted to operate in the second mode to communicate pen state information 108 to touch sensitive device 110. It will be understood, however, that second communication interface 204 need not comprise a Bluetooth communication interface, which is merely exemplary. In other embodiments, second communication interface 204 may comprise any type of wireless communication interface adapted for communication between adaptable digital pen 102 and touch sensitive device 110.

In embodiments, communication decision module 206 of adaptable digital pen 102 may determine whether touch sensitive device 110 is enabled to receive pen state information 108 via second communication interface 204 by attempting to establish communication with touch sensitive device 110 using, for example, a pre-determined protocol operating over Bluetooth. Such a protocol may or may not function like an active pen protocol as known in the art, but instead may function in any manner capable of facilitating the exchange of information between adaptable digital pen 102 and touch sensitive device 110. In another embodiment, communication decision module 206 may be enabled to communicate via second communication interface 204 using any of a number of different protocols that may be compatible with proprietary Bluetooth protocols associated with touch sensitive devices 110 from different manufacturers. Embodiments of communication decision module 206 of adaptable digital pen 102 may attempt to establish communication with touch sensitive device 110 by trying each such protocol in turn until one such Bluetooth protocol works, or until such time as an attempt has been made with every protocol, and no response was received. In embodiments, communication decision module 206 of adaptable digital pen 102 is configured to determine that touch sensitive device 110 is enabled to receive pen state information 108 upon successful receipt of return communication from touch sensitive device 110 via second communication interface 204.

Flowchart 400 concludes with step 408. At step 408, in response to determining that the touch sensitive device is enabled to receive the pen state information via the second communication channel, the digital pen continues to operate in the second mode. For example, when communication decision module 206 determines that touch sensitive device 110 is enabled to receive pen state information 108 while operating adaptable digital pen 102 in the second mode, communication decision module 206 will continue to operate adaptable digital pen 102 in the second mode since operating in the second mode will suffice for delivering pen state information 108 to touch sensitive device 110.

In the foregoing discussion of steps 402-408 of flowchart 400, it should also be understood that at times, such steps may be performed in a different order or even contemporaneously with other steps. For example, in embodiments, steps 402 and 404 pertaining to operating in a first mode, steps 406 and 408 pertaining to operating in a second mode could be done in the reverse order. Likewise, determining whether a touch sensitive device is enabled to receive pen state information via first or second communication channels, as performed in steps 402 and 406, may be performed simultaneously in some embodiments. Other operational embodiments will be apparent to persons skilled in the relevant art(s). Note also that the foregoing general description of the operation of adaptable digital pen 102 is provided for illustration only, and embodiments of adaptable digital pen 102 may comprise different hardware and/or software and may operate in manners different than described above.

As discussed above, touch sensitive devices may receive pen state information from adaptable digital pen 102 via a first communication channel in different ways, and embodiments of adaptable digital pen 102 may be configured to determine the proper manner in which to do so. For example, FIG. 5 shows a flowchart 500 of a process for determining whether a touch sensitive device is receiving pen state information from a digital pen via a first communication channel while operating in a first mode, according to an embodiment. Flowchart 500 is described with continued reference to FIG. 2. However, other structural and operational embodiments will be apparent to persons skilled in the relevant art(s) based on the following discussion regarding flowchart 500 and adaptable digital pen 102 of FIG. 2.

Flowchart 500 begins with step 502. Step 502 attempts to establish two-way communication with the touch sensitive device through the first communication channel while operating the digital pen in the first mode, and when the attempt is successful, continues to operate the digital pen in the first mode. For example, and as discussed above in relation to flowchart 400 of FIG. 4, embodiments of communication decision module 206 of adaptable digital pen 102 may be configured to determine whether touch sensitive device 110 is enabled to receive pen state information 108 from adaptable digital pen 102 while operating in a first mode by attempting to establish two-way communication between adaptable digital pen 102 and touch sensitive device 110 via the communication channel associated with first communication interface 202. More specifically, communication decision module 206 may be configured to operate adaptable digital pen 102 in a first mode to attempt to establish two-way communication with touch sensitive device 110 via first communication interface 202 by trying each of a number of different active pen protocols to determine whether two-way communication may be established with any of them. Also as discussed above, such an attempt is successful when adaptable digital pen 102 successfully receives return communication from touch sensitive device 110 via first communication interface 202 and, as a result, embodiments of adaptable digital pen 102 continue to operate in the first mode.

Flowchart 500 continues with step 504. At step 504, when the attempt to establish two-way communication with the touch sensitive device through the first communication channel is not successful, an attempt is made to establish two-way communication with the touch sensitive device through the second communication channel. For example, even though adaptable digital pen 102 may not have succeeded in establishing two-way communication with touch sensitive device 110 through first communication interface 202, it may be possible for embodiments of adaptable digital pen 102 to establish one-way communication with touch sensitive device 110 through first communication interface 202. Prior to doing so, however, communication decision module 206 of adaptable digital pen 102 must attempt to establish two-way communication with touch sensitive device 110 via second communication interface 204 in the manner described above in relation to flowchart 400.

Flowchart 500 continues at step 506. At step 506, when the attempt to establish two-way communication with the touch sensitive device through the second communication channel is successful, it is determined through the second communication channel whether the touch sensitive device is enabled to receive one-way communication of the pen state information from the digital pen via the first communication channel. For example, communication decision module 206 of adaptable digital pen 102 may be configured to determine through second communication interface 204 whether touch sensitive device 110 is enabled to receive one-way communication of pen state information 108 via first communication interface 202. A two-way communication channel via second communication interface 204 is necessary for adaptable digital pen 102 to learn from touch sensitive device 110 that pen state information 108 sent by adaptable digital pen 102 via first communication interface 202 is, in fact, being received by touch sensitive device 110, and that adaptable digital pen 102 should continue to send pen state information 108 via first communication interface 202.

Flowchart 500 continues at step 508. At step 508, when it is determined that the touch sensitive device is enabled to receive one-way communication of pen state information via the first communication channel, the digital pen continues to operate in the first mode. For example, after successfully establishing two-way communication with touch sensitive device 110 through second communication interface 204, touch sensitive device 110 may then communicate to adaptable digital pen 102 that touch sensitive device 110 is, in fact, receiving pen state information 108. In response, communication decision module 206 operates adaptable digital pen 102 and the first mode. Furthermore, adaptable digital pen 102 may also shut down second communication interface 204, or set it to a low power mode, in an embodiment. Such power savings is possible since pen state information 108 will continue to be transferred to touch sensitive device 110 via first communication interface 202, and second communication interface 204 may be used sparingly if at all.

In the foregoing discussion of steps 502-508 of flowchart 500, it should also be understood that at times, such steps may be performed in a different order or even contemporaneously with other steps. Other operational embodiments will be apparent to persons skilled in the relevant art(s).

Of course, and as discussed above, it will not always be possible for embodiments of adaptable digital pen 102 to establish communication with a touch sensitive device in either the first mode or the second mode, thereby enabling it to transfer pen state information to the touch sensitive device. In such instances, embodiments may be configured to operate in a "generic" mode that may allow adaptable digital pen 102 to function as an input device with the touch sensitive device in question. For example, FIG. 6 shows a flowchart 600 of a process for determining that an adaptable digital pen cannot be configured to operate with a touch sensitive device in either a first mode or a second mode, according to an example embodiment. Flowchart 600 is described with continued reference to FIG. 2. However, other structural and operational embodiments will be apparent to persons skilled in the relevant art(s) based on the following discussion regarding flowchart 600 and adaptable digital pen 102 of FIG. 2.

Flowchart 600 begins with step 602. In step 602, when it is determined that the touch sensitive device is not enabled to receive pen state information via the second communication channel or when the attempt to establish two-way communication with the touch sensitive device through the second communication channel is not successful, the digital pen is operated by operating the pen tip with reflective capacitive output characteristics and not transmitting pen state information. For example, and with reference to flowchart 400 of FIG. 4, communication decision module 206 determines that touch sensitive device 110 is not enabled to receive pen state information 108 at step 406. Note that at step 406, that steps 402 and 404 have already been performed, which means communication decision module 206 likewise determined that the sensitive device 110 is not enabled to perform two-way communication with adaptable digital pen 102 via first communication interface 202. Likewise, when communication decision module 206 determines that the attempt to establish two-way communication with touch sensitive device 110 through second communication interface 204 was not successful, communication decision module 206 likewise implicitly determines that one-way communication of pen state information 108 from adaptable digital pen 102 to touch sensitive device 110 is not possible. Accordingly, because embodiments have failed to establish either one-way or two-way communication between adaptable digital pen 102 and touch sensitive device 110 via first communication interface 202, and because embodiments have failed to establish communication via second communication interface 204, it is not possible for embodiments of adaptable digital pen 102 to communicate pen state information 108 to touch sensitive device 110 by any means whatsoever. In this instance, embodiments of communication decision module 206 operate tip electrode 114 of adaptable digital pen 102 with reflective capacitive output characteristics.

As discussed above, embodiments of adaptable digital pen 102 may be configured to attempt to determine an operating mode for adaptable digital pen 102 that may be compatible with any touch sensitive device without regard for the particular make and model of the touch sensitive device. Embodiments of touch sensitive device 110 may likewise be enabled to operate in various modes appropriate to a digital pen or other input method being employed by the user and may comprise various hardware for such operation.

For example, FIG. 3 shows touch sensitive device 110, according to an example embodiment. Touch sensitive device 110 includes hardware 304. Hardware 304 includes a touchscreen 306 which itself includes digitizer 104. Digitizer 104 includes digitizer communication interface 308. Hardware 304 also includes a central processing unit (CPU) 310, a random-access memory (RAM) 312 and input/output (I/O) module 314. I/O module 314 includes alternate communication interface 316. Touch sensitive device 110 further includes software 320 that may be loaded into RAM 312 and accessed therefrom for execution by CPU 310 of hardware 304. Software 320 includes an operating system 322 on which is executing a device driver 326 and a host application 324.

In an embodiment, hardware 304 of touch sensitive device 110 includes touchscreen 306. In FIG. 3, digitizer 104 is depicted as being integrated into touchscreen 306. Such a configuration is exemplary only, and in other embodiments, touch sensitive device 110 may include a separate digitizer 104 that is not integrated into a touch screen. For example, touch sensitive device 110 may comprise a touchpad, trackpad, graphics pad, graphics tablet, drawing tablet, drawing pad, pen tablet, digital art board, or other types of similar touch sensitive devices capable of being used with adaptable pen 102 for capturing handwriting or drawings, and the like. Such embodiments of touch sensitive device 110 will not typically include a display or have digitizer 104 integrated into a touch screen.

Digitizer 104 as depicted in FIG. 3 also includes digitizer communication interface 308 enabled to communicate with adaptable digital pen 102 via first communication interface 202 as shown in FIG. 2. In embodiments, the type and manner of operation of digitizer communication interface 308 is identical to that described above in relation to first communication interface 202 of adaptable digital pen 102.

CPU 310 of hardware 304 may be coupled to RAM 312 and I/O module 314 in digitizer 104 of touchscreen 306, either directly or through I/O module 314. In an embodiment, touch input 318, generated at digitizer 104 may be provided to I/O module 314. Touch input 318 may comprise the touch inputs detected by digitizer 104 in response to user interactions with touch sensitive device 110 (whether with adaptable digital pen 102 or other input devices). In embodiments, touch input 318 may also include pen state information 108 received from adaptable digital pen 102 by digitizer 104 as discussed above.

I/O module 314 may include any of several types of bus structures, including a memory bus or memory controller, a peripheral bus coupled to, for example, digitizer 104 of touchscreen 306, an accelerated graphics port, and a processor or local bus coupling CPU 310 with RAM 312. Touch input 318 may initially be processed by operating system 322 of software 320 through device driver 326 that may be configured to accept touch input 318 from I/O module 314. In an embodiment, device driver 326 may be configured to further process or filter touch input 318 prior to providing same to host application 324.

In an embodiment, I/O module 314 also includes alternate communication interface 316 enabled to communicate with adaptable digital pen 102 via second communication interface 204 as shown in FIG. 2. In embodiments, the type and manner of operation of alternate communication interface 316 is identical to that described above in relation to second communication interface 204 of adaptable digital pen 102.

Note that foregoing general description of touch sensitive device 110 is provided for illustration only, and embodiments of touch sensitive device 110 may comprise different hardware and/or software and may operate in manners different than described above. A description of an embodiment of touch sensitive device 110 in operation will now be discussed in conjunction with the discussion of flowchart 700 of FIG. 7. The description of touch sensitive device 110 herein below makes express reference to adaptable digital pen 102 as depicted in FIGS. 1 and 2. It should be understood, however, that the discussed operation of embodiments of touch sensitive device 110 does not depend on the ability of adaptable digital pen 102 to adapt its functioning as discussed above in relation to flowcharts 400 through 600. Instead, the operation of touch sensitive device 110 described herein below, may be performed in conjunction with any type of digital pen.

Embodiments of touch sensitive device 110 of FIG. 3 may operate in various ways to adaptively switch operating modes to accommodate different types of digital pens, such as, for example, adaptable digital pen 102. For instance, FIG. 7 shows a flowchart 700 of a process for determining whether to operate touch sensitive device 110 with a digital pen in a first mode or second mode, according to an embodiment. Flowchart 700 is described with continued reference to FIG. 3. However, other structural and operational embodiments will be apparent to persons skilled in the relevant art(s) based on the following discussion regarding flowchart 700 and touch sensitive device 110 of FIG. 3.

Flowchart 700 begins with step 702. Step 702 determines whether the touch sensitive device is receiving pen state information from the digital pen via a first communication channel while operating the touch sensitive device in a first mode. In an embodiment, touch sensitive device 110 may be configured to operate in a first mode, and determine whether pen state information 108 is being received from adaptable digital pen 102 via the communication channel associated with digitizer communication interface 308. For example, touch sensitive device 110 may determine pen state information 108 is being received by detecting valid pen state data on digitizer communication interface 308 according to an active pen protocol.

Flowchart 700 continues with step 704. At step 704, and in response to determining that the touch sensitive device is receiving pen state information from the digital pen via the first communication channel, the touch sensitive device will continue to operate in the first mode. For example, when touch sensitive device 110 determines that it is receiving pen state information 108 on digitizer communication interface 308 while operating in the first mode, touch sensitive device 110 will continue to operate in the first mode. In an embodiment, touch sensitive device 110 will continue to operate in the first mode until it stops receiving valid pen state information 108 on digitizer communication interface 308.

Flowchart 700 continues with step 706. At step 706, and in response to determining that the touch sensitive device is not receiving the pen state information via the first communication channel, touch sensitive device is switched to operate in a second mode and determines whether the touch sensitive device is enabled to receive the pen state information from the digital pen via a second communication channel. For example, touch sensitive device 110 may be configured to switch touch sensitive device 110 to operate in a second mode, and to determine whether touch sensitive device 110 is enabled to receive pen state information 108 from adaptable digital pen 102 via the communication channel associated with alternate communication interface 316 of FIG. 3. In an embodiment, touch sensitive device 110 may be configured to operate in a second mode, whereby pen state information 108 may be received using alternate communication interface 316 as shown in FIG. 3.

Flowchart 700 continues with step 708. At step 708, and in response to determining that the touch sensitive device is enabled to receive the pen state information via the second communication channel, the touch sensitive device continues to operate the touch sensitive device in the second mode. For example, when touch sensitive device 110 determines that it is enabled to receive pen state information 108 while operating in the second mode, touch sensitive device 110 will continue to operate in the second mode since operating in the second mode will suffice for receiving pen state information 108 from adaptable digital pen 102. In embodiments, touch sensitive device 110 will continue to operate in the second mode for as long as it continues to receive valid pen state information 108 from adaptable digital pen 102.

In the foregoing discussion of steps 702-708 of flowchart 700, it should also be understood that at times, such steps may be performed in a different order or even contemporaneously with other steps. For example, in embodiments, steps 702 and 704 pertaining to operating in a first mode, steps 706 and 708 pertaining to operating in a second mode could be done in the reverse order. Likewise, determining whether touch sensitive device 110 is receiving pen state information, or is enabled to receive such information, via first or second communication channels, respectively, as performed in steps 702 and 706, may be performed simultaneously in some embodiments. Other operational embodiments will be apparent to persons skilled in the relevant art(s).

Figure 8:
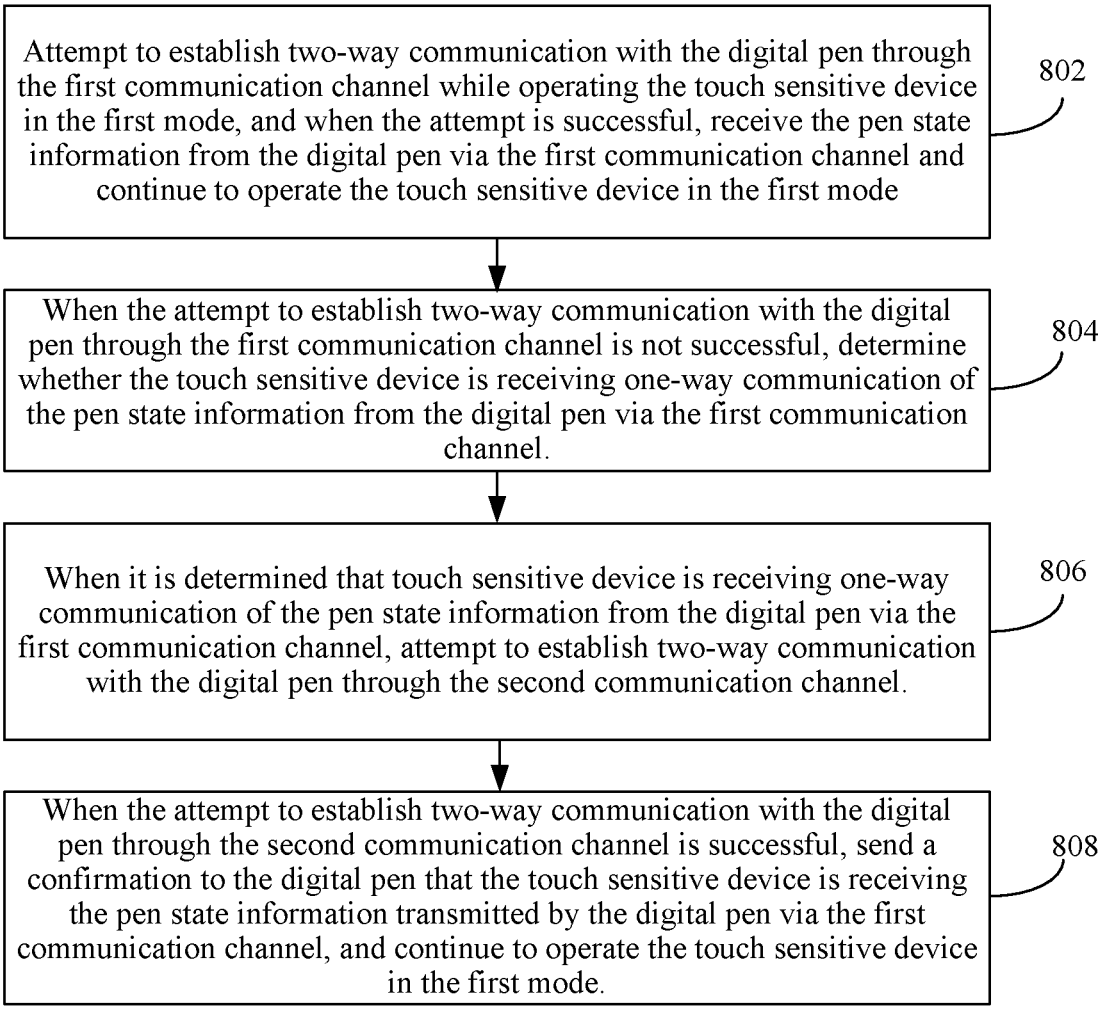
FIG. 8 shows a flowchart of a process for determining whether a touch sensitive device is receiving pen state information from a digital pen via a first communication channel while operating the touch sensitive device in a first mode, according to an embodiment.

As discussed above, touch sensitive devices may receive pen state information from adaptable digital pen 102 via a first communication channel in different ways, and embodiments of touch sensitive device 110 may be configured to determine the proper manner in which to do so. For example, FIG. 8 shows a flowchart 800 of a process for determining whether a touch sensitive device is receiving pen state information from a digital pen via a first communication channel while operating the touch sensitive device in a first mode, according to an embodiment. Flowchart 800 is described with continued reference to FIG. 3. However, other structural and operational embodiments will be apparent to persons skilled in the relevant art(s) based on the following discussion regarding flowchart 800 and touch sensitive device 110 of FIG. 3.

Flowchart 800 begins with step 802. In step 802, an attempt is made to establish two-way communication with a digital pen through a first communication channel while operating a touch sensitive device in a first mode, and when the attempt is successful, the touch sensitive device receives the pen state information from the digital pen via the first communication channel and continues to operate the touch sensitive device in the first mode. For example, embodiments of touch sensitive device 110 may be configured to determine whether touch sensitive device 110 is receiving pen state information 108 from adaptable digital pen 102 while operating in a first mode by attempting to establish two-way communication between adaptable digital pen 102 and touch sensitive device 110 via the communication channel associated with digitizer communication interface 308 of FIG. 3. More specifically, touch sensitive device 110 may be configured to operate in a first mode to attempt to establish two-way communication with adaptable digital pen 102 via digitizer communication interface 308 by trying each of a number of different active pen protocols to determine whether two-way communication may be established with any of them. Such an attempt is successful when touch sensitive device 110 successfully receives return communication from adaptable digital pen 102 via digitizer communication interface 308 and, as a result, embodiments of touch sensitive device 110 continue to operate in the first mode.

Flowchart 800 continues with step 804. At step 804, when the attempt to establish two-way communication with the digital pen through the first communication channel is not successful, the touch sensitive device determines whether it is receiving one-way communication of the pen state information from the digital pen via the first communication channel. For example, even though touch sensitive device 110 may not have succeeded in establishing two-way communication with adaptable digital pen 102 through digitizer communication interface 308 at step 802, it may nevertheless be possible for embodiments of touch sensitive device 110 to establish one-way communication with touch sensitive device 110 through digitizer communication interface 308. After failing to establish two-way communication with adaptable digital pen 102, embodiments of touch sensitive device 110 will determine it is receiving one-way communication of pen state information 108 by detecting valid pen state information on digitizer communication interface 308.

Flowchart 800 continues with step 806. At step 806, when it is determined that touch sensitive device is receiving one-way communication of the pen state information from the digital pen via the first communication channel, the touch sensitive device attempts to establish two-way communication with the digital pen through the second communication channel. For example, in response to determining at step 804 that touch sensitive device 110 is receiving valid pen state information 108 on digitizer communication interface 308, touch sensitive device 110 may attempt to establish two-way communication with adaptable digital pen 102 via alternate communication interface 316. A two-way communication channel via alternate communication interface 316 is necessary for adaptable digital pen 102 to learn from touch sensitive device 110 that pen state information 108 sent by adaptable digital pen 102 via first communication interface 202 is, in fact, being received by touch sensitive device 110, and that adaptable digital pen 102 should continue to send pen state information 108 via first communication interface 202.

Flowchart 800 continues with step 808. At step 808, when the attempt to establish two-way communication with the digital pen through the second communication channel is successful, the touch sensitive device sends a confirmation to the digital pen that the touch sensitive device is receiving the pen state information transmitted by the digital pen via the first communication channel and continues to operate the touch sensitive device in the first mode. For example, after successfully establishing two-way communication with adaptable digital pen 102 through digitizer communication interface 308, embodiments of touch sensitive device 110 then communicate to adaptable digital pen 102 that touch sensitive device 110 is, in fact, receiving pen state information 108. Likewise, touch sensitive device 110 will thereafter continue to operate in the first mode to receive pen state information 108 from adaptable digital pen 102 while valid pen state information 108 is being received.

In the foregoing discussion of steps 802-808 of flowchart 800, it should also be understood that at times, such steps may be performed in a different order or even contemporaneously with other steps. Other operational embodiments will be apparent to persons skilled in the relevant art(s).

Figure 9:
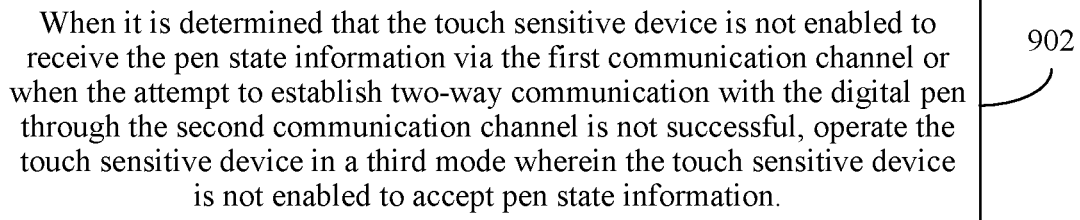
FIG. 9 shows a flowchart of a process for determining that a touch sensitive device cannot be configured to operate with a digital pen in either a first mode or a second mode, according to an example embodiment.

Of course, and as discussed above, it will not always be possible for embodiments of touch sensitive device 110 to establish communication with a digital pen in either the first mode or the second mode to enable it to receive pen state information from the digital pen. In such instances, embodiments may be configured to operate in a "generic" mode that may allow touch sensitive device 110 to function as an input device having widely compatible operating characteristics. For example, FIG. 9 shows a flowchart 900 of a process for determining that that a touch sensitive device cannot be configured to operate with a particular digital pen in either a first or second mode, according to an example embodiment. Flowchart 900 is described with continued reference to FIG. 2. However, other structural and operational embodiments will be apparent to persons skilled in the relevant art(s) based on the following discussion regarding flowchart 900 and adaptable digital pen 102 of FIG. 2.

Flowchart 900 begins with step 902. In step 902, when it is determined that the touch sensitive device is not enabled to receive the pen state information via the second communication channel or when the attempt to establish two-way communication with the digital pen through the second communication channel is not successful, touch sensitive device will operate in a third mode wherein the touch sensitive device is not enabled to accept pen state information. For example, touch sensitive device 110 may determine that it is not enabled to receive pen state information 108 from adaptable digital pen 102 via digitizer communication interface 308. Attempts by touch sensitive device 110 to establish two-way communication with adaptable digital pen 102 may likewise fail. In such instances, touch sensitive device 110 has no means by which to receive pen state information 108 from adaptable digital pen 102, and touch sensitive device 110 will therefore switch to a third mode wherein touch sensitive device 110 is not enabled to accept or process pen state information 108.

III. Example Computer System Implementation

First communication interface 202, second communication interface 204, communication decision module 206, CPU 310, RAM 312, I/O module 314, software 320, operating system 322, host application 324, device driver 326 and flowcharts 400-900 may be implemented in hardware, or hardware combined with software and/or firmware. For example, first communication interface 202, second communication interface 204, communication decision module 206 and flowcharts 400, 500, 600, 700, 800 and/or 900 may be implemented as computer program code/instructions configured to be executed in one or more processors and stored in a computer readable storage medium. Alternatively, first communication interface 202, second communication interface 204, communication decision module 206 and flowcharts 400, 500, 600, 700, 800 and/or 900 may be implemented as hardware logic/electrical circuitry (e.g., electrical circuits comprised of transistors, logic gates, operational amplifiers, one or more application specific integrated circuits (ASICs), one or more field programmable gate arrays (FPGAs), etc.).

For instance, in an embodiment, one or more, in any combination, of first communication interface 202, second communication interface 204, communication decision module 206, sensor(s) 106, CPU 310, RAM 312, I/O module 314, software 320, operating system 322, host application 324, device driver 326, and flowcharts 400, 500, 600, 700, 800 and/or 900 may be implemented in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
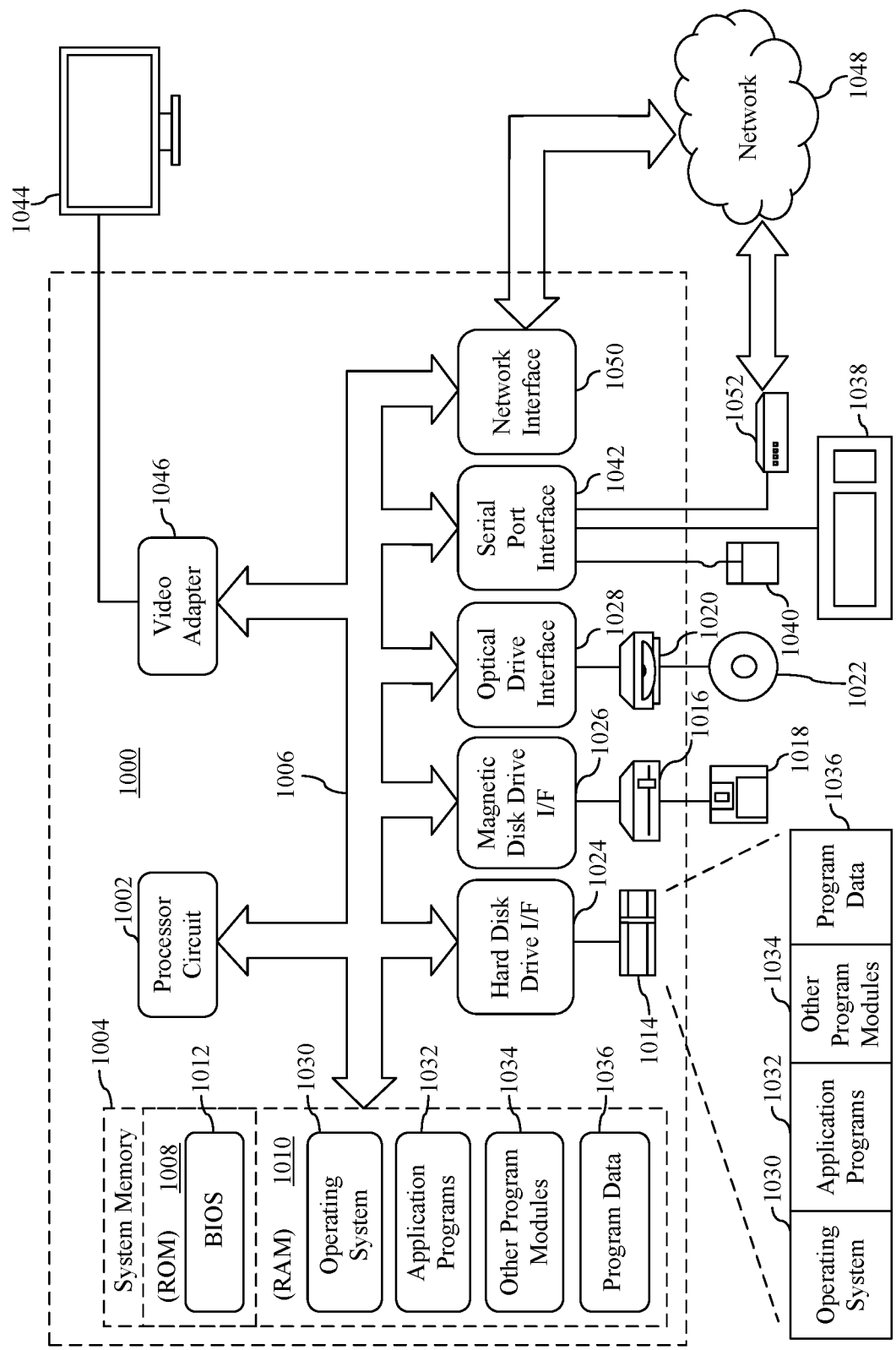
FIG. 10 is a block diagram of an example processor-based computer system that may be used to implement various embodiments.

FIG. 10 depicts an exemplary implementation of a computing device 1000 in which embodiments may be implemented. For example, mobile electronic device 102 may be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard dis, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing first communication interface 202, second communication interface 204, communication decision module 206, software 320, operating system 322, host application 324, device driver 326 and flowcharts 400, 500, 600, 700, 800 and/or 900 (including any suitable step of flowcharts 400, 500, 600, 700, 800, and/or 900), and/or further embodiments described herein.

A user may enter commands and information into the computing device 1000 through input devices such as keyboard 1038 and pointing device 1040. Other input devices (not shown) may include a microphone, joystick, game pad, satellite dish, scanner, a touch sensitive and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments described herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method of operating a digital pen that includes a pen tip with configurable output characteristics is described herein. The method includes: determining whether a touch sensitive device is enabled to receive pen state information from the digital pen via a first communication channel while operating the digital pen in a first mode; in response to determining that the touch sensitive device is enabled to receive the pen state information via the first communication channel, continuing to operate the digital pen in the first mode; in response to determining that the touch sensitive device is not enabled to receive the pen state information via the first communication channel, switching the digital pen to operate in a second mode and determining whether the touch sensitive device is enabled to receive the pen state information from the digital pen via a second communication channel; and in response to determining that the touch sensitive device is enabled to receive the pen state information via the second communication channel, continuing to operate the digital pen in the second mode.

In one embodiment of the foregoing method, determining whether the touch sensitive device is enabled to receive the pen state information from the digital pen via the first communication channel while operating the digital pen in the first mode comprises: attempting to establish two-way communication with the touch sensitive device through the first communication channel while operating the digital pen in the first mode, and when the attempt is successful, continuing to operate the digital pen in the first mode; when the attempt to establish two-way communication with the touch sensitive device through the first communication channel is not successful, attempting to establish two-way communication with the touch sensitive device through the second communication channel; when the attempt to establish two-way communication with the touch sensitive device through the second communication channel is successful, determining through the second communication channel whether the touch sensitive device is enabled to receive one-way communication of the pen state information from the digital pen via the first communication channel; and when it is determined that the touch sensitive device is enabled to receive one-way communication of pen state information via the first communication channel, continuing to operate the digital pen in the first mode.

In one embodiment of the foregoing method, when it is determined that the touch sensitive device is not enabled to receive pen state information via the second communication channel or when the attempt to establish two-way communication with the touch sensitive device through the second communication channel is not successful, operating the digital pen by operating the pen tip with reflective capacitive output characteristics and not transmitting pen state information.

In one embodiment of the foregoing method, the first communication channel comprises an RF pen protocol communication channel between the digital pen and a digitizer included in the touch sensitive device.

In one embodiment of the foregoing method, the second communication channel comprises a Bluetooth communication channel.

In one embodiment of the foregoing method, operating the digital pen in the first mode comprises: operating the pen tip with active pen protocol output characteristics; intermittently collecting pen state information; and transmitting the collected pen state information to the touch sensitive device via the first communication channel.

In one embodiment of the foregoing method, operating the digital pen in the second mode comprises: operating the pen tip with reflective capacitive output characteristics; intermittently collecting pen state information; and transmitting the collected pen state information to the touch sensitive device using the second communication channel.

In one embodiment of the foregoing method, the pen state information comprises at least one of: information derived from the pressure sensor, pen identifier (ID) information, timestamp information, tilt angle information, information based on a state of at least one inertial sensor, or information based on a state of at least one button of the digital pen.

A method of operating touch sensitive device to receive digital pen input and provide same to a host application executing on the touch sensitive device, the digital pen including a pen tip with configurable output characteristics, is described herein. The method includes: determining whether the touch sensitive device is receiving pen state information from the digital pen via a first communication channel while operating the touch sensitive device in a first mode; in response to determining that the touch sensitive device is receiving pen state information from the digital pen via the first communication channel, continuing to operate the touch sensitive device in the first mode; in response to determining that the touch sensitive device is not receiving the pen state information via the first communication channel, switching the touch sensitive device to operate in a second mode and determining whether the touch sensitive device is enabled to receive the pen state information from the digital pen via a second communication channel; and in response to determining that the touch sensitive device is enabled to receive the pen state information via the second communication channel, continuing to operate the touch sensitive device in the second mode.

In one embodiment of the foregoing method, determining whether the touch sensitive device is receiving the pen state information from the digital pen via the first communication channel while operating the touch sensitive device in the first mode comprises: attempting to establish two-way communication with the digital pen through the first communication channel while operating the touch sensitive device in the first mode, and when the attempt is successful, receiving the pen state information from the digital pen via the first communication channel and continuing to operate the touch sensitive device in the first mode; when the attempt to establish two-way communication with the digital pen through the first communication channel is not successful, determining whether the touch sensitive device is receiving one-way communication of the pen state information from the digital pen via the first communication channel; when it is determined that touch sensitive device is receiving one-way communication of the pen state information from the digital pen via the first communication channel, attempting to establish two-way communication with the digital pen through the second communication channel; when the attempt to establish two-way communication with the digital pen through the second communication channel is successful, sending a confirmation to the digital pen that the touch sensitive device is receiving the pen state information transmitted by the digital pen via the first communication channel, and continuing to operate the touch sensitive device in the first mode.

In one embodiment of the foregoing method, when it is determined that the touch sensitive device is not enabled to receive the pen state information via the second communication channel or when the attempt to establish two-way communication with the digital pen through the second communication channel is not successful, operating the touch sensitive device in a third mode wherein the touch sensitive device is not enabled to accept pen state information.

In one embodiment of the foregoing method, the first communication channel comprises an RF pen protocol communication channel between the digital pen and a digitizer included in the touch sensitive device.

In one embodiment of the foregoing method, the second communication channel comprises a Bluetooth communication channel.

In one embodiment of the foregoing method, operating the touch sensitive device in the first mode comprises: operating the digitizer according to an active pen protocol that detects pen tip position and receives pen state information via the first communication channel; providing the detected pen tip position and pen state information to the host application.

In one embodiment of the foregoing method, operating the touch sensitive device in the second mode comprises: operating the digitizer to accept touch input via a capacitive sensor; receiving pen state information via the second communication channel; correlating the received pen state information with the touch input to determine pen tip position; providing the determined pen tip position and pen state information to the host application.

In one embodiment of the foregoing method, pen state information comprises at least one of: information derived from a pressure sensor, pen identifier (ID) information, timestamp information, tilt angle information, information based on a state at least one inertial sensor, or information based on a state of at least one button of the digital pen.

A digital pen is described herein. The digital pen includes: a shaft; a pen tip including a tip electrode with configurable output characteristics and disposed along a longitudinal axis at a first end of the shaft; a pressure sensor disposed proximate the pen tip; a first communication interface enabled to communicate with a touch sensitive device via a first communication channel; a second communication interface enabled to communicate with the touch sensitive device via a second communication channel; and a communication decision module disposed within the shaft and coupled to the tip electrode, the pressure sensor, the first communication interface and the second communication interface, the communication decision module configured to: determine whether the touch sensitive device is enabled to receive pen state information from the digital pen via the first communication channel while operating the digital pen in a first mode; in response to determining that the touch sensitive device is enabled to receive the pen state information via the first communication channel, continue to operate the digital pen in the first mode; in response to determining that the touch sensitive device is not enabled to receive the pen state information via the first communication channel, switch the digital pen to operate in a second mode and determine whether the touch sensitive device is enabled to receive the pen state information from the digital pen via the second communication channel while operating in the second mode; and in response to determining that the touch sensitive device is enabled to receive the pen state information via the second communication channel, continue to operate the digital pen in the second mode.

In one embodiment of the foregoing digital pen, operating the digital pen in the first mode comprises: operating the tip electrode with active pen protocol output characteristics; intermittently collecting pen state information; and transmitting the collected pen state information to the touch sensitive device via the first communication channel.

In one embodiment of the foregoing digital pen, operating the digital pen in the second mode comprises: operating the tip electrode with reflective capacitive output characteristics; intermittently collecting pen state information; and transmitting the collected pen state information to the touch sensitive device via the second communication channel.

In one embodiment of the foregoing digital pen, pen state information comprises at least one of: information derived from a pressure sensor, pen identifier (ID) information, timestamp information, tilt angle information, information based on a state at least one inertial sensor, or information based on a state of at least one button of the digital pen.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments but should be defined only in accordance with the following claims and their equivalents.

What is claimed is:

1. A method of operating a touch sensitive device to receive digital pen input and provide same to a host application executing on the touch sensitive device, the digital pen including a pen tip with configurable output characteristics, the method comprising:
    determining whether the touch sensitive device is receiving pen state information from the digital pen via a first communication channel while operating the touch sensitive device in a first mode;
    in response to determining that the touch sensitive device is receiving pen state information from the digital pen via the first communication channel, continuing to operate the touch sensitive device in the first mode;
    in response to determining that the touch sensitive device is not receiving the pen state information via the first communication channel, switching the touch sensitive device to operate in a second mode and determining whether the touch sensitive device is enabled to receive the pen state information from the digital pen via a second communication channel;
    in response to determining that the touch sensitive device is enabled to receive the pen state information via the second communication channel, continuing to operate the touch sensitive device in the second mode; and
    when it is determined that the touch sensitive device is not enabled to receive the pen state information via the second communication channel, switching the touch sensitive device to operate in a third mode.

2. The method of claim 1, wherein determining whether the touch sensitive device is receiving the pen state information from the digital pen via the first communication channel while operating the touch sensitive device in the first mode comprises:
    attempting to establish two-way communication with the digital pen through the first communication channel while operating the touch sensitive device in the first mode, and when the attempt is successful, receiving the pen state information from the digital pen via the first communication channel and continuing to operate the touch sensitive device in the first mode;
    when the attempt to establish two-way communication with the digital pen through the first communication channel is not successful, determining whether the touch sensitive device is receiving one-way communication of the pen state information from the digital pen via the first communication channel;
    when it is determined that touch sensitive device is receiving one-way communication of the pen state information from the digital pen via the first communication channel, attempting to establish two-way communication with the digital pen through the second communication channel;
    when the attempt to establish two-way communication with the digital pen through the second communication channel is successful, sending a confirmation to the digital pen that the touch sensitive device is receiving the pen state information transmitted by the digital pen via the first communication channel, and continuing to operate the touch sensitive device in the first mode.

3. The method of claim 1, wherein operating the touch sensitive device in a third mode comprises operating the touch sensitive device in a third mode wherein the touch sensitive device is not enabled to accept pen state information.

4. The method of claim 1, wherein the first communication channel comprises an RF pen protocol communication channel between the digital pen and a digitizer included in the touch sensitive device.

5. The method of claim 4, wherein the second communication channel comprises a Bluetooth communication channel.

6. The method of claim 1, wherein operating the touch sensitive device in the first mode comprises:
    operating the digitizer according to an active pen protocol that detects pen tip position and receives pen state information via the first communication channel; and
    providing the detected pen tip position and pen state information to the host application.

7. The method of claim 1, wherein operating the touch sensitive device in the second mode comprises:
    operating the digitizer to accept touch input via a capacitive sensor;
    receiving pen state information via the second communication channel;
    correlating the received pen state information with the touch input to determine pen tip position; and
    providing the determined pen tip position and pen state information to the host application.

8. The method of claim 1, wherein the pen state information comprises at least one of: information derived from a pressure sensor, pen identifier (ID) information, timestamp information, tilt angle information, information based on a state at least one inertial sensor, or information based on a state of at least one button of the digital pen.

9. A touch sensitive device configured to receive digital pen input and provide same to a host application executing on the touch sensitive device, the digital pen including a pen tip with configurable output characteristics, the touch sensitive device comprising:
    a digitizer including a first communication channel;
    an input/output module including a second communication channel;
    one or more processor circuits;
    one or more memory devices connected to the one or more processor circuits, the one or more memory devices storing computer program logic recorded thereon that when executed by the one or more processor circuits, causes the one or more processor circuits to perform operations, the operations comprising:

determining whether the touch sensitive device is receiving pen state information from the digital pen via the first communication channel while operating the touch sensitive device in a first mode;

in response to determining that the touch sensitive device is receiving pen state information from the digital pen via the first communication channel, continuing to operate the touch sensitive device in the first mode;

in response to determining that the touch sensitive device is not receiving the pen state information via the first communication channel, switching the touch sensitive device to operate in a second mode and determining whether the touch sensitive device is enabled to receive the pen state information from the digital pen via the second communication channel;

in response to determining that the touch sensitive device is enabled to receive the pen state information via the second communication channel, continuing to operate the touch sensitive device in the second mode; and when it is determined that the touch sensitive device is not enabled to receive the pen state information via the second communication channel, switching the touch sensitive device to operate in a third mode.

10. The touch sensitive device of claim 9, wherein determining whether the touch sensitive device is receiving the pen state information from the digital pen via the first communication channel while operating the touch sensitive device in the first mode comprises:

attempting to establish two-way communication with the digital pen through the first communication channel while operating the touch sensitive device in the first mode, and when the attempt is successful, receiving the pen state information from the digital pen via the first communication channel and continuing to operate the touch sensitive device in the first mode;

when the attempt to establish two-way communication with the digital pen through the first communication channel is not successful, determining whether the touch sensitive device is receiving one-way communication of the pen state information from the digital pen via the first communication channel;

when it is determined that touch sensitive device is receiving one-way communication of the pen state information from the digital pen via the first communication channel, attempting to establish two-way communication with the digital pen through the second communication channel;

when the attempt to establish two-way communication with the digital pen through the second communication channel is successful, sending a confirmation to the digital pen that the touch sensitive device is receiving the pen state information transmitted by the digital pen via the first communication channel, and continuing to operate the touch sensitive device in the first mode.

11. The touch sensitive device of claim 9, wherein operating the touch sensitive device in a third mode comprises operating the touch sensitive device in a third mode wherein the touch sensitive device is not enabled to accept pen state information.

12. The touch sensitive device of claim 9, wherein the first communication channel comprises an RF pen protocol communication channel between the digital pen and the digitizer.

13. The touch sensitive device of claim 12, wherein the second communication channel comprises a Bluetooth communication channel.

14. A computer program product comprising a computer-readable memory device having computer program logic recorded thereon that when executed by at least one processor of a computing device causes the at least one processor to perform operations, the operations comprising:

determining whether a touch sensitive device is receiving pen state information from a digital pen via a first communication channel while operating the touch sensitive device in a first mode;

in response to determining that the touch sensitive device is receiving pen state information from the digital pen via the first communication channel, continuing to operate the touch sensitive device in the first mode;

in response to determining that the touch sensitive device is not receiving the pen state information via the first communication channel, switching the touch sensitive device to operate in a second mode and determining whether the touch sensitive device is enabled to receive the pen state information from the digital pen via a second communication channel;

in response to determining that the touch sensitive device is enabled to receive the pen state information via the second communication channel, continuing to operate the touch sensitive device in the second mode; and when it is determined that the touch sensitive device is not enabled to receive the pen state information via the second communication channel, switching the touch sensitive device to operate in a third mode.

15. The computer program product of claim 14, wherein determining whether the touch sensitive device is receiving the pen state information from the digital pen via the first communication channel while operating the touch sensitive device in the first mode comprises:

attempting to establish two-way communication with the digital pen through the first communication channel while operating the touch sensitive device in the first mode, and when the attempt is successful, receiving the pen state information from the digital pen via the first communication channel and continuing to operate the touch sensitive device in the first mode;

when the attempt to establish two-way communication with the digital pen through the first communication channel is not successful, determining whether the touch sensitive device is receiving one-way communication of the pen state information from the digital pen via the first communication channel;

when it is determined that touch sensitive device is receiving one-way communication of the pen state information from the digital pen via the first communication channel, attempting to establish two-way communication with the digital pen through the second communication channel;

when the attempt to establish two-way communication with the digital pen through the second communication channel is successful, sending a confirmation to the digital pen that the touch sensitive device is receiving the pen state information transmitted by the digital pen via the first communication channel, and continuing to operate the touch sensitive device in the first mode.

16. The computer program product of claim 14, wherein operating the touch sensitive device in a third mode comprises operating the touch sensitive device in a third mode wherein the touch sensitive device is not enabled to accept pen state information.

17. The computer program product of claim 14, wherein the first communication channel comprises an RF pen protocol communication channel between the digital pen and a digitizer included in the touch sensitive device.

18. The computer program product of claim 17, wherein the second communication channel comprises a Bluetooth communication channel.

19. The computer program product of claim 14, wherein operating the touch sensitive device in the first mode comprises:
- operating the digitizer according to an active pen protocol that detects pen tip position and receives pen state information via the first communication channel; and
- providing the detected pen tip position and pen state information to the host application.

20. The computer program product of claim 14, wherein operating the touch sensitive device in the second mode comprises:
- operating the digitizer to accept touch input via a capacitive sensor;
- receiving pen state information via the second communication channel;
- correlating the received pen state information with the touch input to determine pen tip position; and
- providing the determined pen tip position and pen state information to the host application.

* * * * *